US012112721B2

(12) United States Patent
Her et al.

(10) Patent No.: US 12,112,721 B2
(45) Date of Patent: *Oct. 8, 2024

(54) APPARATUS AND METHOD FOR DRIVING DISPLAY BASED ON FREQUENCY OPERATION CYCLE SET DIFFERENTLY ACCORDING TO FREQUENCY

(71) Applicant: SAMSUNG ELECTRONICS CO., LTD., Suwon-si (KR)

(72) Inventors: Yongkoo Her, Suwon-si (KR); Youngdo Kim, Suwon-si (KR); Jungbae Bae, Suwon-si (KR); Hyunchang Shin, Suwon-si (KR); Joongyu Lee, Suwon-si (KR); Songhee Jung, Suwon-si (KR); Jaeseung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/370,069

(22) Filed: Jul. 8, 2021

(65) Prior Publication Data

US 2021/0335325 A1 Oct. 28, 2021

Related U.S. Application Data

(63) Continuation of application No. 16/906,385, filed on Jun. 19, 2020, now Pat. No. 11,069,323.

(30) Foreign Application Priority Data

Jun. 19, 2019 (KR) ........................ 10-2019-0072959

(51) Int. Cl.
*G09G 5/10* (2006.01)
*G09G 3/3233* (2016.01)

(52) U.S. Cl.
CPC ............. *G09G 5/10* (2013.01); *G09G 3/3233* (2013.01); *G09G 2320/064* (2013.01); *G09G 2354/00* (2013.01)

(58) Field of Classification Search
CPC .. G09G 5/10; G09G 3/3233; G09G 2320/064; G09G 2354/00; G09G 3/3406;
(Continued)

(56) References Cited

U.S. PATENT DOCUMENTS 6,040,826 A 3/2000 Furukawa
8,207,977 B1 6/2012 Kumar et al.
(Continued)

FOREIGN PATENT DOCUMENTS

CN 103366699 A 10/2013
CN 105489171 A 4/2016
(Continued)

OTHER PUBLICATIONS

U.S. Appl. No. 16/906,385, filed Jun. 19, 2020; Her et al.
(Continued)

*Primary Examiner* — Mihir K Rayan
(74) *Attorney, Agent, or Firm* — Nixon & Vanderhye P.C.

(57) ABSTRACT

Various embodiments disclose a method and an apparatus including a display, a memory including information on a number of duty cycles per one refresh period for emitting light by pixels of the display corresponding to each of a plurality of refresh rates of the display, and a processor, wherein the processor is configured to control the electronic device to perform an operation according to a first number of duty cycles based on the display operating at a first refresh rate, and perform an operation according to a second number of duty cycles based on the display operating at a second
(Continued)

refresh rate, wherein the first number is less than the second number based on the first refresh rate being higher than the second refresh rate.

12 Claims, 13 Drawing Sheets

(58) Field of Classification Search
CPC ............. G09G 3/3648; G09G 2310/08; G09G 2320/024; G09G 2330/022; G09G 2360/16; G09G 3/3225; G09G 3/3208; G09G 2320/0276; G06F 3/0486; G06F 3/0488
See application file for complete search history.

(56) References Cited

U.S. PATENT DOCUMENTS

| | | | | |
|---|---|---|---|---|
| 9,824,632 | B2 | 11/2017 | Chaji et al. | |
| 11,069,323 | B2* | 7/2021 | Her | G09G 3/3233 |
| 2004/0183822 | A1* | 9/2004 | Woo | G09G 3/3406 345/691 |
| 2008/0094383 | A1 | 4/2008 | Stessen et al. | |
| 2008/0100598 | A1* | 5/2008 | Juenger | G09G 5/36 345/204 |
| 2010/0321305 | A1* | 12/2010 | Chang | G06F 3/0445 345/173 |
| 2013/0093736 | A1 | 4/2013 | Katsuse | |
| 2013/0208189 | A1 | 8/2013 | White et al. | |
| 2013/0257918 | A1 | 10/2013 | Tada | |
| 2016/0077617 | A1* | 3/2016 | Lee | G06F 3/04184 345/173 |
| 2016/0093248 | A1 | 3/2016 | Shimizu et al. | |
| 2016/0125785 | A1* | 5/2016 | Wang | G09G 3/3648 345/582 |
| 2016/0329017 | A1* | 11/2016 | Chaji | H05B 47/10 |
| 2017/0124934 | A1* | 5/2017 | Verbeure | G09G 3/3611 |
| 2017/0124965 | A1 | 5/2017 | Verbeure | |
| 2018/0059868 | A1* | 3/2018 | Brahma | G09G 3/2022 |
| 2018/0151109 | A1 | 5/2018 | Shim et al. | |
| 2018/0157371 | A1 | 6/2018 | Harrison et al. | |
| 2018/0158418 | A1 | 6/2018 | Ryu et al. | |
| 2018/0204541 | A1 | 7/2018 | Chaji et al. | |
| 2018/0342202 | A1 | 11/2018 | Sung et al. | |
| 2018/0350313 | A1 | 12/2018 | Nambi et al. | |
| 2019/0057646 | A1 | 2/2019 | Lin et al. | |
| 2020/0402478 | A1* | 12/2020 | Her | G09G 3/3233 |
| 2023/0075226 | A1* | 3/2023 | Lee | G09G 3/2096 |

FOREIGN PATENT DOCUMENTS

| | | | |
|---|---|---|---|
| CN | 108109583 | A | 6/2018 |
| CN | 109410832 | A | 3/2019 |
| CN | 213545872 | U | 6/2021 |
| KR | 10-2007-0053207 | | 5/2007 |
| KR | 10-2015-0121141 | A | 10/2015 |
| KR | 10-2018-0065194 | A | 6/2018 |
| KR | 10-2018-0129019 | A | 12/2018 |

OTHER PUBLICATIONS

Extended European Search Report dated Oct. 27, 2020 for EP Application No. 20181170.0.

PCT International Search Report/Written Opinion dated Sep. 21, 2020 for PCT/KR2020/007952.

Indonesia Office Action dated Feb. 20, 2024 for Indonesia Application No. P00202111106.

Chinese Office Action dated Jan. 23, 2024 for CN Application No. 202010566553.9.

Korean Office Action dated Jul. 28, 2023 for KR Application No. 10-2019-0072959.

* cited by examiner

APPARATUS AND METHOD FOR DRIVING DISPLAY BASED ON FREQUENCY OPERATION CYCLE SET DIFFERENTLY ACCORDING TO FREQUENCY

CROSS-REFERENCE TO RELATED APPLICATION

This application is a Continuation of U.S. application Ser. No. 16/906,385, filed Jun. 19, 2020 (now U.S. Pat. No. 11,069,323), which claims priority to KR 10-2019-0072959, filed Jun. 19, 2019, the entire contents of which are all hereby incorporated herein by reference in their entireties.

BACKGROUND

Field

The disclosure relates to an apparatus and a method for driving a display based on a frequency operation cycle differently set based on a frequency.

Description of Related Art

With the development of digital technology, various types of electronic devices, such as a mobile communication terminal, a personal digital assistant (PDA), an electronic organizer, a smartphone, a tablet personal computer (PC), and a wearable device, are being widely used. Electronic devices are designed to efficiently manage limited resources (e.g., processes, memory, or power). The hardware and/or software aspects of electronic devices are continuously being improved in order to support and enhance functions.

For example, a display (or display panel) of an electronic device may include organic light emitting diode (OLEDs). Organic light emitting diodes may be divided into a passive-matrix type and an active-matrix type according to a driving mode. In an active-matrix organic light emitting diode (AMOLED), when a scan signal, a data signal, and driving power are supplied to a plurality of pixels disposed in a matrix, a selected pixel emits light, thereby displaying an image. Normally, human eyes can perceive 15 consecutive frames per second as a natural video without recognizing a flickering phenomenon (e.g., flicker). Therefore, an electronic device may generally drive a display at a frequency of 60 Hz.

An electronic device may drive a display at a high-speed frequency of 60 Hz or higher (e.g., 90 Hz or 120 Hz) when displaying a game screen, playing a video, or entering a touch. When the frequency of the display is changed from 60 Hz to 90 Hz, the difference between a gamma value set for 60 Hz and a gamma value set for 90 Hz may cause an increase in brightness difference, and a user may perceive (or recognize) the brightness difference.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a method and an apparatus for setting a frequency operation cycle corresponding to each frequency, based on a common divisor of frequencies (operating frequencies) of a display, driving the display, based on the set frequency operation cycle, and changing the frequency of the display corresponding to an even when the event is detected.

An electronic device according to various example embodiments may include: a display; a memory including information on a number of duty cycles per one refresh period for emitting light by pixels of the display corresponding to each of a plurality of refresh rates of the display, and a processor, wherein the processor may be configured to control the electronic device to: perform an operation according to a first number of duty cycles based on the display operating at a first refresh rate; and to perform an operation based on a second number of duty cycles based on the display operating at a second refresh rate, and the first number may be less than the second number based on the first refresh rate being higher than the second refresh rate.

An electronic device according to various example embodiments may include: a display; a memory including gamma data corresponding to at least two frequencies of the display; and a processor, wherein the processor may be configured to control the electronic device to: drive the display at a first frequency, detect an event, and change the first frequency to a second frequency corresponding to the event based on the stored gamma data.

An operating method of an electronic device according to various example embodiments may include: operating according to a first number of duty cycles based on a display of the electronic device operating at a first refresh rate; and operating according to a second number of duty cycles based on the display operating at a second refresh rate, wherein the first number may be less than the second number based on the first refresh rate being higher than the second refresh rate.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
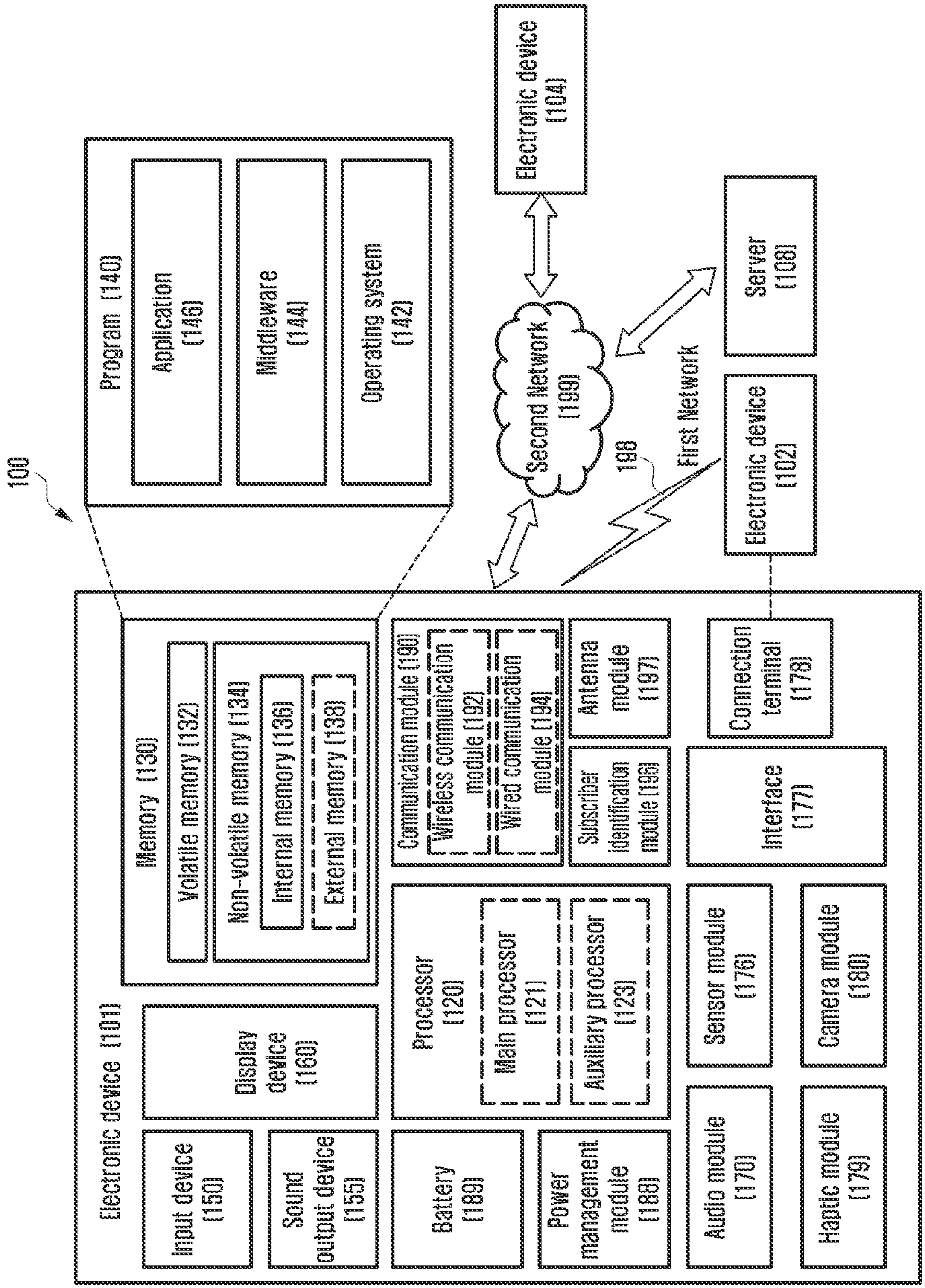
FIG. 1 is a block diagram illustrating an example electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device (e.g., the electronic device 101 of FIG. 1) according to various example embodiments may include: a display (e.g., the display device 160 of FIG. 1); a memory (e.g., the memory 130 of FIG. 1) including information on a number of duty cycles per one refresh period for emitting light by pixels of the display corresponding to each of a plurality of refresh rates of the display; and a processor (e.g., the processor 120 of FIG. 1), wherein the processor may be configured to control the electronic device to: perform an operation according to a first number of duty cycles based on the display operating at a first refresh rate; and perform an operation according to a second number of duty cycles based on the display operating at a second refresh rate, and the first number may be less than the second number based on the first refresh rate being higher than the second refresh rate.

The length of one duty cycle corresponding to the first refresh rate may be set to be substantially the same as the length of one duty cycle corresponding to the second refresh rate.

One refresh period may include a first porch period based on an operation being performed at the first refresh rate, and may include a second porch period, different from the first porch period, based on an operation being performed at the second refresh rate.

One duty cycle may include a light emitting period and a non-light emitting period, and light emitting periods and non-light emitting periods corresponding to different refresh rates may be configured to have the same time.

The processor may be configured to control the electronic device to determine the number of duty cycles corresponding to each refresh rate based on a common divisor of refresh rates for driving the display, and to include as many light emitting periods and non-light emitting periods as the number of duty cycles in the duty cycles corresponding to each refresh rate.

The processor may be configured to control the electronic device to include a porch period in one refresh period based on the determined number of duty cycles.

The processor may be configured to control the electronic device to include as many non-light emitting periods as the number of light emitting periods included in the duty cycles, as black periods in the duty cycles.

The processor may be configured to control the electronic device to detect an event and to change the first refresh rate set in the display to the second refresh rate corresponding to the event.

The event may include at least one of detection of a user input, execution of a preset application, detection of a user input in a preset application, where a variance in an image is a reference value or greater, display of a still image, or whether the electronic device is available for a preset time.

The processor may be configured to control the electronic device to change to the second refresh rate higher than the first refresh rate based on the event being at least one of the user input, the execution of the preset application, the detection of the user input in the preset application, or where the variance in the image is the reference value or greater.

The processor may be configured to control the electronic device to change to the second refresh rate lower than the first refresh rate based on the event being the display of the still image or based on the electronic device being unavailable for the preset time.

The processor may be configured to control the electronic device to change to different refresh rates based on the type of a touch input of the user input.

The processor may be configured to control the electronic device to determine whether a touch drag is detected after changing to the second refresh rate, to maintain the second refresh rate based on the touch drag being detected, and to change to the first refresh rate based on the touch drag not being detected.

The processor may be configured to control the electronic device to change to a refresh rate lower than the first refresh rate based on the touch drag not being detected and a still image being displayed on the display.

The processor may be configured to control the electronic device to change the first refresh rate to the second refresh rate by stages.

The processor may be configured to control the electronic device to change the first refresh rate to a third refresh rate, to drive the display during a duty cycle corresponding to the third refresh rate, and to change the third refresh rate to the second refresh rate.

The memory may include gamma data corresponding to at least two refresh rates of the display, and the processor may be configured to control the electronic device to detect an event and to change the first refresh rate to the second refresh rate corresponding to the event based on the stored gamma data.

The processor may be configured to control the electronic device to predict gamma data of the second refresh rate based on the stored gamma data, and to change to the second refresh rate based on the predicted gamma data.

Figure 2:
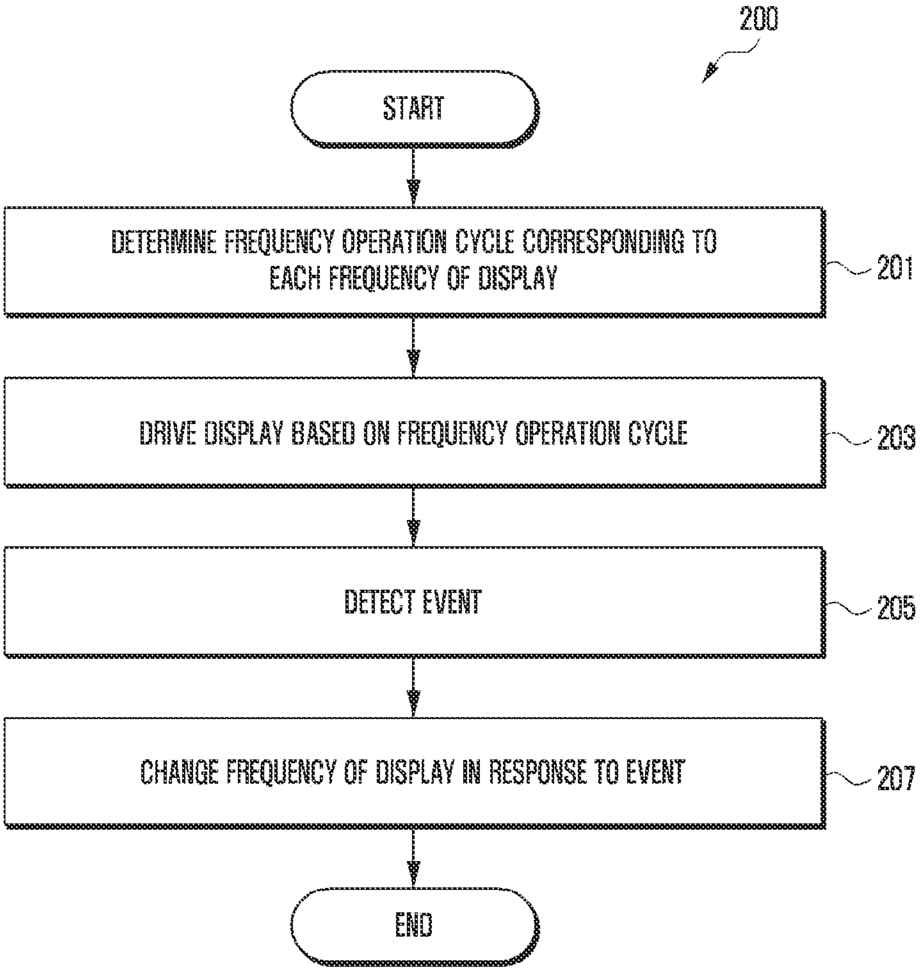
FIG. 2 is a flowchart illustrating an example display driving method of an electronic device according to various embodiments.

FIG. 2 is a flowchart 200 illustrating an example display driving method of an electronic device according to various embodiments.

Referring to FIG. 2, in operation 201, a processor (e.g., the processor 120 of FIG. 1) of an electronic device (e.g., the electronic device 101 of FIG. 1) according to various embodiments may control the electronic device to determine a frequency operation cycle corresponding to each frequency of a display (e.g., the display device 160 of FIG. 1). Although operations are performed by the processor 120 in the following description, a display driver integrated circuit (DDI) may selectively perform the operations. For example, the DDI may perform the following operations instead of the processor 120 while the processor 120 is in an inactive (e.g., sleep) state.

An image (or video) may result from a continuous movement of still images (or frames). A refresh rate may refer, for example, to the number of times per second a display presents a frame on a screen and may simply be a measure indicating how many scenes can be displayed in a second. A refresh rate uses a unit of hertz (Hz), which may refer, for example, to the number of repetitions per second. For example, a display with a refresh rate of 60 Hz may be understood as displaying a screen 60 times for one second. A similar concept of frames per second (FPS) is mainly used for a source of an image (e.g., software), while hertz is a concept of a frequency having a repeated cycle and may be used for hardware of a display.

Conventionally, the number of duty cycles per one refresh period (or frequency operation cycle) for any frequency may be set to 4 regardless of the frequency of a display. For example, a screen is displayed 60 times per second at a frequency (or refresh rate) of 60 Hz and a screen is displayed 90 times per second at a frequency of 90 Hz, the frequencies may have a difference in time (or length) of one duty cycle included in a frequency operation cycle. For example, the numbers of frames for display at the respective frequencies are different, but the frequencies have the same the number of duty cycle of 4 and may thus have different times of one duty cycle. When a difference occurs in time of one duty cycle, a difference in time of frequency operation cycle between frequencies increases when a frequency is changed, and thus an image on the screen may appear unnatural. According to the disclosure, in order to address the conventional problem, the processor 120 may determine the number of duty cycles corresponding to each frequency, based on a common divisor between frequencies of the display.

According to various embodiments, the processor 120 may determine a frequency operation cycle corresponding to each frequency such that times (or lengths) of one duty cycle (e.g., 1 duty cycle) of frequencies match. One duty cycle may include one light emitting period and one non-light emitting period. The frequency operation cycle (e.g., refresh period) corresponding to the frequency may include one or more duty cycles. For example, the processor 120 may identify frequencies at which the display device 160 can operate. The frequencies at which the display device 160 can operate may range, for example, from 1 Hz to 120 Hz. The processor 120 may determine the frequency operation cycle corresponding to each frequency, based, for example, on a common divisor of 1 Hz to 120 Hz. A common divisor may refer, for example, to a common factor of two or more numbers. The processor 120 may identify (or determine) 24 Hz, 30 Hz, 60 Hz, 90 Hz, and 120 Hz used when the display device 160 actually operates among the frequencies ranging from 1 Hz to 120 Hz. The processor 120 may determine the number of duty cycles corresponding to each frequency, based on a common divisor of 24, 30, 60, 90, and 120. The processor 120 may determine the number of duty cycles corresponding to the frequency to be an integer multiple of a common divisor of two adjacent frequencies.

For example, the processor 120 may determine the number of duty cycles for 24 Hz to be 15, the number of duty cycles for 30 Hz to be 12, the number of duty cycles for 60 Hz to be 6, the number of duty cycles for 90 Hz to be 4, and the number of duty cycles for 120 Hz to be 2. The number of duty cycles for a frequency may be a frequency operation cycle (e.g., refresh period). For example, a frequency operation cycle corresponding to 120 Hz for which the number of duty cycles is 2 may include two duty cycles, a frequency operation cycle corresponding to 90 Hz for which the number of duty cycles is 4 may include four duty cycles, a frequency operation cycle corresponding to 60 Hz for which the number of duty cycles is 6 may include six duty cycles, a frequency operation cycle corresponding to 30 Hz for which the number of duty cycles is 12 may include 12 duty cycles, and a frequency operation cycle corresponding to 24 Hz for which the number of duty cycles is 15 may include 15 duty cycles. The processor 120 may set the time of one duty cycle included in respective frequency operation cycles corresponding to different frequencies to be the same. For example, the time of one duty cycle for 24 Hz, the time of one duty cycle for 60 Hz, the time of one duty cycle for 90 Hz, or the time of one duty cycle for 120 Hz may be the same.

According to various embodiments, the processor 120 may include a black (e.g., porch) period in the frequency operation cycle. When an image (or video) is played, a preparation time may be required between frames, and the black period may be for achieving synchronization between frames. The processor 120 may determine (or set) the black period, based on the number of duty cycles corresponding to each frequency. For example, when the number of duty cycles is 2, the processor 120 may set the black period to 2, and when the number of duty cycles is 4, the processor 120 may set the black period to 4. The black period may include as many non-light emitting periods as the number of light emitting periods (or non-light emitting periods) included in the determined frequency operation cycle and may be variable according to the number of light emitting periods included in the frequency operation cycle. For example, the display device 160 may drive a duty cycle including one light emitting period and one non-light emitting period twice and may then drive a frame black period including two non-light emitting periods, thereby driving a frequency of 120 Hz. The display device 160 may drive a duty cycle including one light emitting period and one non-light emitting period four times and may then drive a frame black period including four non-light emitting periods, thereby driving a frequency of 90 Hz.

In operation 203, the processor 120 (or DDI of the electronic device) may drive the display (e.g., the display device 160), based on the frequency operation cycle corresponding to the frequency. The processor 120 may drive the display device 160 through a DDI used to drive pixels included in the display device 160. The processor 120 may drive the display device 160 at a reference frequency (or intermediate frequency, e.g., 60 Hz). The reference frequency may, for example, be a frequency operating in a normal situation (e.g., a normal mode). The normal mode may refer, for example, to a state in which the display device 160 is turned on and a user uses the electronic device 101. The normal mode may be a case that does not correspond to an event for a frequency change. The processor 120 may drive the display device 160 at a frequency (e.g., 30 Hz) lower than the reference frequency in the normal mode. The foregoing description is simply a non-limiting example provided to aid the understanding of the disclosure and is not intended to limit the disclosure. A frequency to drive the display device 160 in the normal mode may be preset in the electronic device 101, which may be an issue in implementation of the electronic device 101 and does not limit the disclosure.

In operation 205, the processor 120 may detect an event. The event may correspond, for example, to a trigger signal for a frequency change. The frequency change may refer, for example, to a change (or switch) to a frequency (e.g., 1 Hz or 30 Hz) lower than the driving frequency (e.g., 60 Hz) in operation 203 or a frequency (e.g., 90 Hz or 120 Hz) higher than the driving frequency. For example, the processor 120 may determine that the event is detected when at least one is detected among detection of a user input, execution of a preset (or specific) application, detection of a user input within a preset application, a case where an image variance is a reference value or higher, display of a still image, or whether the electronic device 101 is available for a preset time. According to various embodiments, the user input may include at least one of a touch by a user on one point of the display device 160 with a touch input tool (e.g., a user's body part (e.g., a finger) or a stylus pen), detachment of a pen (e.g., a stylus pen) mounted on the electronic device 101, a voice command, an input with a physical button, or an input through a sensor. A touch input by touching with the touch input tool may include at least one a tap, a double tap, a long tap, a multi-touch (e.g., zoom-in/zoom-out), a drag, a drag and drop, a flick, and a press depending on the type. The processor 120 may detect different events according to the type of a touch input. The processor 120 may detect the user input using touch circuitry configured to detect a touch.

The tap may, for example, be an operation in which the user touches one point on the display device 160 and then performs a touch-off of the touch input tool from the point without moving the touch input tool. The double tap may, for example, be an operation of tapping one point on the display device 160 twice in succession, and the long tap may be an operation of touching a point for a longer time than the tap and then performing a touch-off of the touch input tool from the point without moving the touch input tool. The multi-touch may, for example, be an operation of moving the touch input tool that is touching at least two points on the display device 160. For example, the multi-touch may be a zoom-in/zoom-out. The drag may, for example, be an operation of moving the touch input tool that is touching one point on the display device 160. The drag and drop may, for example, be an operation of dragging and then performing a touch-off of the touch input tool. The flick may, for example, be an operation of moving the touch input tool faster than dragging and then performing a touch-off. The press may, for example, be an operation of touching a point with the touch input tool and then pressing the point.

In order to use the electronic device 101, a user may detach a pen (e.g., a stylus pen) from the electronic device 101. When the pen is detached from the electronic device 101, the processor 120 may determine that an event is detected. The processor 120 may determine that an event is detected when a voice command to call (or wake up) the electronic device 101 is detected from a microphone (e.g., the input device 150 of FIG. 1) or when a physical button is selected. The input through the sensor may include at least one of an input for authentication through a fingerprint sensor (e.g., the sensor module 176 in FIG. 1) that may be disposed under the display (e.g., the display device 160 in FIG. 1) or execution of a specified application (e.g., a game application or a touch-required application) when a pre-stored motion (or a gesture) is performed.

In operation 207, the processor 120 (or DDI of the electronic device) may change the frequency of the display (e.g., the display device 160) in response to the event. For example, the processor 120 may change the display device 160, which operates at a frequency of 60 Hz in operation 203, to a frequency ranging from 1 Hz to 120 Hz. According to various embodiments, when the event corresponds to at least one of a user input, execution of a preset application, detection of a user input within a preset application, or a case where an image variance is a reference value or higher, the processor 120 may change the frequency of the display to a frequency (e.g., a high frequency, 90 Hz, or 120 Hz) higher than the operating frequency in operation 203. When the event corresponds to display of a still image or a case where the electronic device 101 is unavailable for a preset time, the processor 120 may change the frequency of the display to a frequency (e.g., a low frequency, 1 Hz, 24 Hz, or 30 Hz) lower than the operating frequency in operation 203.

For example, when the event corresponds to at least one of a user input, execution of a preset application, detection of a user input within a preset application, or a case where an image variance is a reference value or higher, the processor 120 may change the frequency to 120 Hz. When the event corresponds to a user input, the processor 120 may change the frequency to 90 Hz. When the event corresponds to display of a still image or a case where the electronic device 101 is unavailable for a preset time, the processor 120 may change the frequency to 1 Hz. When the event corresponds to display of a still image, the processor 120 may change the frequency to 24 Hz or 30 Hz, and when the event corresponds to a case where the electronic device 101 is unavailable for a preset time, the processor 120 may change the frequency to 1 Hz.

According to various embodiments, the processor 120 may change the frequency to different frequencies based on the type of a touch input. A touch input type including, for example, at least one of a tap, a double tap, a long tap, a flick, or a press may be referred to as a first touch type, and a touch input type including, for example, at least one of a multi-touch, a drag, or a drag and drop may be referred to as a second touch type. When the type of the touch input corresponds to the first touch type, the processor 120 may change the frequency to 90 Hz, and when the type of the touch input corresponds to the second touch type, the processor 120 may change the frequency to 120 Hz. When the type of the touch input corresponds to the first touch type, the processor 120 may change the frequency to 120 Hz, and when the type of the touch input corresponds to the second touch type, the processor 120 may change the frequency to 90 Hz. When the type of the touch input is changed, the processor 120 may change the frequency, based on the type of the changed touch input or may maintain the frequency.

For example, when the event detected in operation 205 corresponds to the second touch type and the frequency is changed to 120 Hz, after which a touch input of the second touch type is detected, the processor 120 may maintain the frequency of 120 Hz. When the event detected in operation 205 corresponds to the second touch type and the frequency is changed to 120 Hz, after which a touch input of the second touch type is not detected, the processor 120 may change the frequency to 60 Hz. When the event detected in operation 205 corresponds to the second touch type and the frequency is changed to 120 Hz, after which a touch input of the first touch type is detected, the processor 120 may change the frequency to 90 Hz or may not change the frequency. According to various embodiments, when a detected touch input is changed from the first touch type to the second touch type, the processor 120 may change the frequency, and when a detected touch input is changed from the second touch type to the first touch type, the processor 120 may not change the frequency.

According to various embodiments, when a user input of the second touch type is terminated, for example, when a second user input is not detected, the processor 120 may immediately change the frequency to 60 Hz. When a second user input is not detected for a certain time after changing the frequency in operation 205, the processor 120 may change the frequency back to 60 Hz.

According to various embodiments, when a still image is displayed or the electronic device 101 is unavailable for a preset time after changing the frequency to a high frequency in operation 207, the processor 120 may change the frequency. For example, when a still image is displayed or the electronic device 101 is unavailable for a preset time after changing the frequency to 120 Hz in operation 207, the processor 120 may change the frequency to 60 Hz or a frequency (e.g., 30 Hz or 1 Hz) less than 60 Hz.

According to various embodiments, the processor 120 may change the frequency by stages. For example, when the frequency is changed to 120 Hz in operation 207 during the operation at 60 Hz in operation 203, the processor 120 may change the frequency from 60 Hz to 90 Hz, may drive one frame at 90 Hz, and may then change the frequency from 90 Hz to 120 Hz. Driving one frame at 90 Hz may refer, for example, to driving a frequency operation cycle corresponding to 90 Hz (e.g., four duty cycles and a black period). When the frequency is changed to 24 Hz in operation 207 during the operation at 60 Hz in operation 203, the processor 120 may change the frequency from 60 Hz to 30 Hz, may drive one frame at 30 Hz, and may then change the frequency from 30 Hz to 24 Hz.

According to various embodiments, the processor 120 may change the frequency without terminating the frequency operation cycle. For example, when an event is detected during a frequency operation cycle (e.g., six duty cycles and a black period) for 60 Hz, the processor 120 may change the frequency to 90 Hz without terminating the frequency operation cycle for 60 Hz. The processor 120 may drive three duty cycles at 60 Hz and may then change the frequency to 90 Hz.

According to various embodiments, the memory 130 may store gamma data (or gamma value) corresponding to at least two frequencies of the display device 160. The processor 120 may predict gamma data of a second frequency, based on the stored gamma data and may drive the display device 160 at the second frequency by reflecting the predicted gamma data.

According to various embodiments, when changing the frequency, the processor 120 may limit a frequency change, based on illuminance sensor information. When changing the frequency of the display, the processor 120 may limit a frequency change to resolve flickering due to a difference in brightness. When ambient light is bright, the visibility of flickering due to brightness may be reduced, and thus the processor 120 may limit a change in the frequency of the display according to the illuminance of ambient light. For example, the processor 120 may obtain illuminance sensor information from an illuminance sensor (e.g., the sensor module 176 of FIG. 1) and may identify (or determine) whether the illuminance sensor information is a reference value or less. When the illuminance sensor information exceeds the reference value, the processor 120 may change the frequency of the display in response to the event, and when the illuminance sensor information is the reference value or less, the processor 120 may not change the frequency of the display in response to the event. When the illuminance sensor information is the reference value or less, the processor 120 may fix the frequency of the display for use. For example, when ambient light is bright, the processor 120 may change the frequency of the display. In a low-illuminance environment (e.g., a dark room), the processor 120 may fix the frequency of the display for use instead of changing the frequency. Fixing the frequency may refer, for example, to maintaining the frequency of the display currently driven. The reference value may be set by the user or may be set by default in the electronic device 101. For example, the reference value may be 10 lux.

According to various embodiments, when changing the frequency, the processor 120 may identify (or determine) whether the state of the display device 160 corresponds to a frequency fixing condition. The frequency fixing condition may include, for example, at least one of illuminance sensor information being a reference value or less, a multi-window environment, display of a keypad, or display of fixed information in a certain area. The processor 120 may determine, as the frequency fixing condition, at least one case of where the illuminance sensor information is the reference value or less, where a multi-window is displayed on the display device 160, where a keypad is displayed on the display device 160, or fixed information (e.g., a key pad or setting window) is displayed in a certain area of the display device 160. The certain area may include a certain portion (e.g., 30%, 50%, or the like) of the total area (e.g., 100%) of the display device 160. The certain area may be set by default in the electronic device 101. When the state of the display corresponds to the frequency fixing condition, the processor 120 may not change the frequency of the display in response to the event. When the state of the display corresponds to the frequency fixing operation, the processor 120 may maintain the frequency of the display currently driven. When the state of the display does not correspond to the frequency fixing condition, the processor 120 may change the frequency of the display in response to the event.

Figure 3:
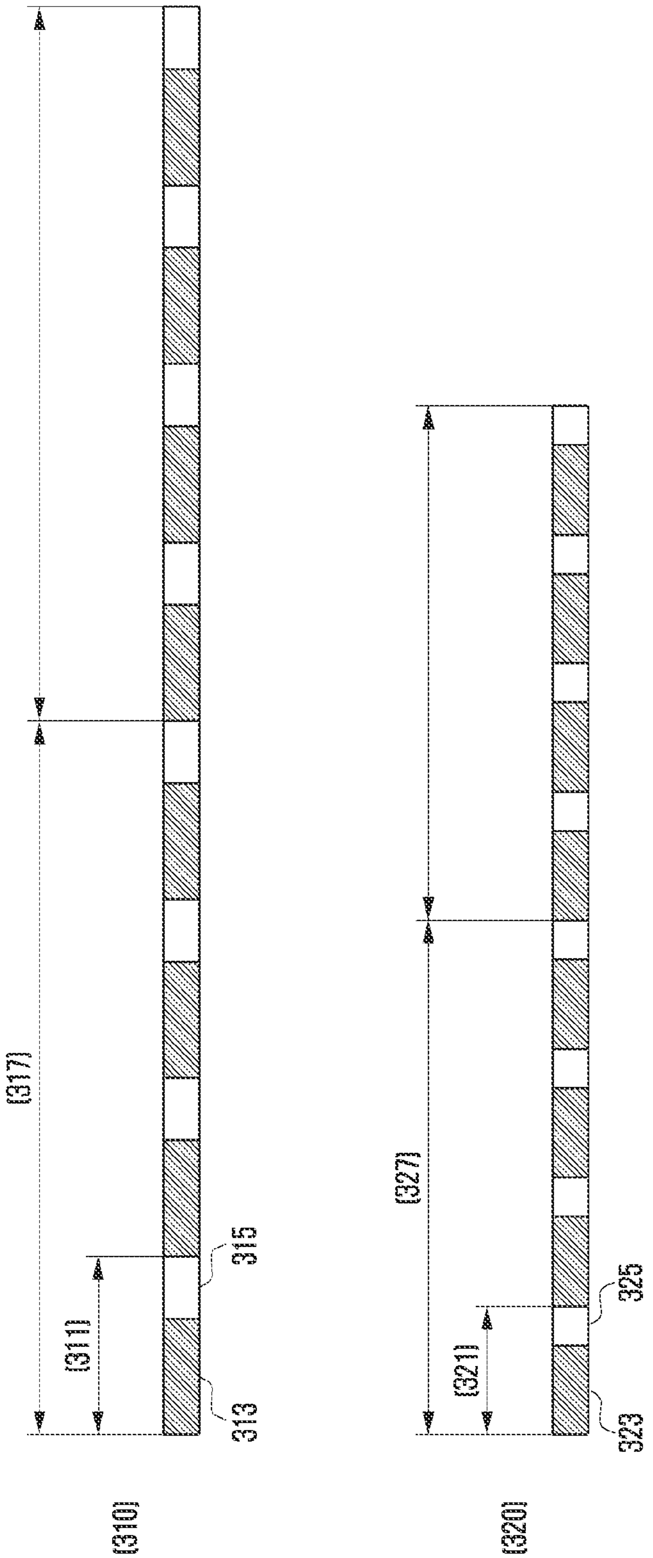
FIG. 3 (RELATED ART)
FIG. 3 is a diagram illustrating an example of a duty cycle for each frequency according to a conventional art.

FIG. 3 is a diagram illustrating an example of a duty cycle for each frequency according to a conventional art.

Referring to FIG. 3, conventionally, the number of duty cycles for any frequency may be set to 4 regardless of the frequency of a display. For example, since a screen is displayed 60 times per second at a 60-Hz frequency 310, one duty cycle 311 (e.g., 1 duty cycle) may have a time of 4.15 ms. Further, since a screen is displayed 90 times per second at a 90-Hz frequency 320, one duty cycle 321 may have a time of 2.775 ms. That is, the numbers of frames for display at the respective frequencies are different, but the frequencies have the same duty cycle of 4 and may thus have different times of one duty cycle. One duty cycle (e.g., 311 and 321) may be divided into a light emitting period (e.g., 313 and 323) and a non-light emitting period (e.g., 315 and 325). Conventionally, there may be a difference in time of a light emitting period and a non-light emitting period in one duty cycle between frequencies. For example, there is a difference in time between the light emitting period 313 of the 60-Hz frequency 310 and the light emitting period 323 of the 90-Hz frequency 320, and there is a difference in time between the non-light emitting period 315 of the 60-Hz frequency 310 and the non-light emitting period 325 of the 90-Hz frequency 320.

Since there is a difference in time of one duty cycle between the 60-Hz frequency 310 and the 90-Hz frequency 320, a difference may also occur in time of a total duty cycle (or frequency operation cycle) therebetween. For example, a total duty cycle 317 (e.g., four duty cycles per one refresh period for emitting light by pixels of the display) for the 60-Hz frequency 310 may have a time of 16.6 ms, and a total duty cycle 327 for the 90-Hz frequency 320 may have a time of 11.1 ms. In this case, when the frequency is changed from the 60-Hz frequency 310 to the 90-Hz frequency 320, the difference in total duty cycle time between the frequencies may be increased. In this case, a difference (e.g., brightness difference) between gamma data (or gamma value) of the 60-Hz frequency 310 and gamma data of the 90-Hz frequency 320 occurs, and a user may recognize (or perceive) the brightness difference.

Figure 4A:
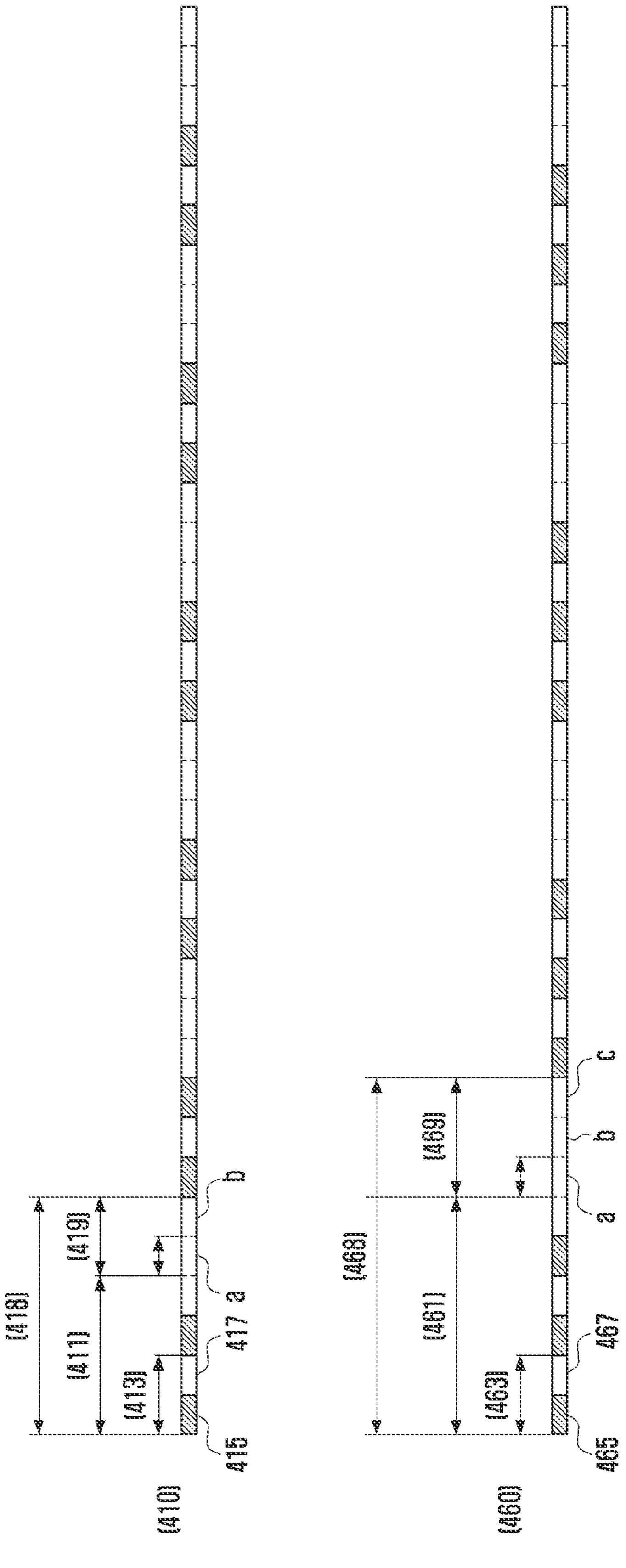
FIG. 4A is a diagram illustrating an example of setting a frequency operation cycle corresponding to each frequency in an electronic device according to various embodiments.
Figure 4B:
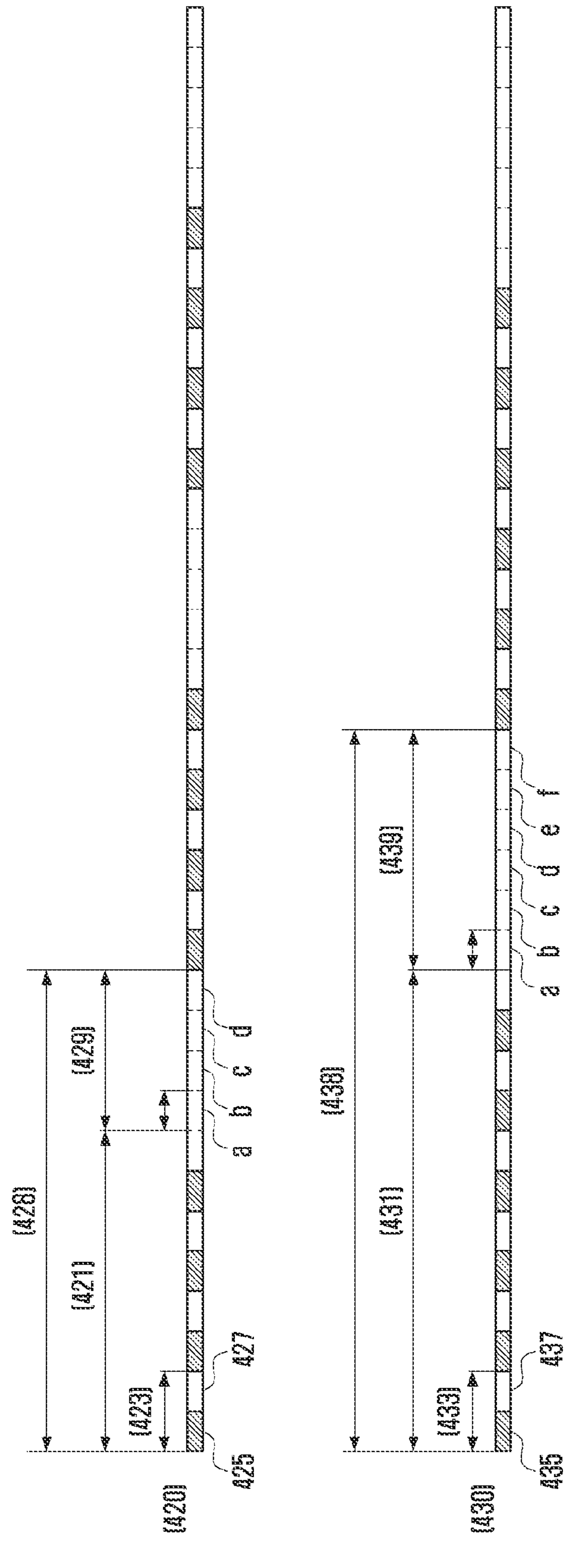
FIG. 4B is a diagram illustrating an example of setting a frequency operation cycle corresponding to each frequency in an electronic device according to various embodiments.
Figure 4C:
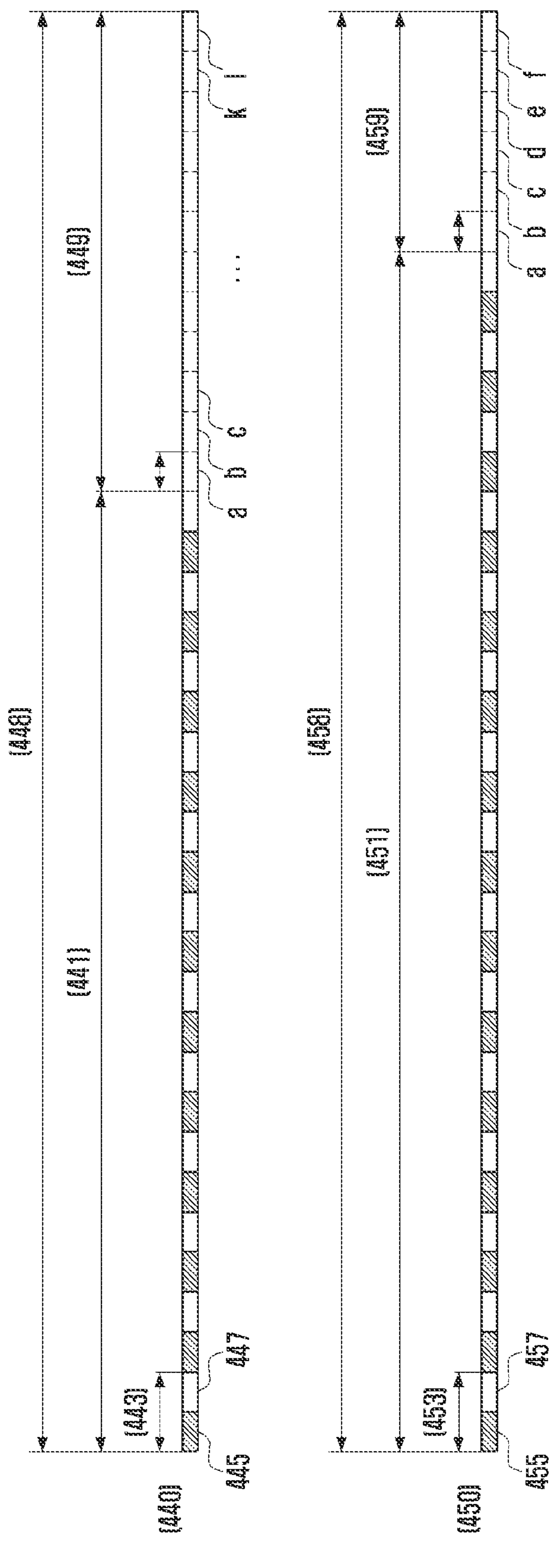
FIG. 4C is a diagram illustrating an example of setting a frequency operation cycle corresponding to each frequency in an electronic device according to various embodiments.

FIG. 4A is a diagram illustrating an example of setting a frequency operation cycle corresponding to each frequency in an electronic device according to various embodiments, FIG. 4B is a diagram illustrating an example of setting a frequency operation cycle corresponding to each frequency in an electronic device according to various embodiments, and FIG. 4C is a diagram illustrating an example of setting a frequency operation cycle corresponding to each frequency in an electronic device according to various embodiments.

Referring to FIG. 4A, 4B and FIG. 4C, a processor (e.g., the processor 120 of FIG. 1) of an electronic device (e.g., the electronic device 101 of FIG. 1) according to various embodiments may determine a frequency operation cycle (e.g., refresh period) corresponding to each frequency such that frequencies have the same time of one duty cycle. For example, the processor 120 may determine the number of duty cycles such that a light emitting period 415, 425, 435, 445, 455, and 465 and a non-light emitting period 417, 427, 437, 447, 457, and 467 in one duty cycle 413, 423, 433, 443, 453, and 463 included in the frequency operation cycle corresponding to each frequency have the same time. For example, the processor 120 may determine the number of duty cycles 411 per one refresh period for a 120-Hz frequency 410 to be 2 or may determine the number of duty cycles 461 per one refresh period for a 120-Hz frequency 460 to be 3. In addition, the processor 120 may determine the number of duty cycles 421 per one refresh period for a 90-Hz frequency 420 to be 4, may determine the number of duty cycles 431 per one refresh period for a 60-Hz frequency 430 to be 6, may determine the number of duty cycles 441 per one refresh period for a 30-Hz frequency 440 to be 12, and may determine the number of duty cycles 451 for a 24-Hz frequency 450 to be 15.

One duty cycle 413 and 463 included in the frequency operation cycle 418 and 468 of the 120-Hz frequency 410 and 460, one duty cycle 423 included in the frequency operation cycle 428 of the 90-Hz frequency 420, one duty cycle 433 included in the frequency operation cycle 438 of the 60-Hz frequency 430, one duty cycle 443 included in the frequency operation cycle 448 of the 30-Hz frequency 440, and one duty cycle 453 included in the frequency operation cycle 458 of the 24-Hz frequency 450 may have the same time.

One duty cycle 413, 423, 433, 443, 453, and 463 corresponding to each frequency 410, 420, 430, 440, 450, and 460 may include one light emitting period 415, 425, 435, 445, 455, and 465 and one non-light emitting period 417, 427, 437, 447, 457, and 467. According to various embodiments, the processor 120 may determine the number (or count) of duty cycles for each frequency and may determine (or set) a black period 419, 429, 439, 449, 459, and 469, based on the determined number of duty cycles 411, 421, 431, 441, 451, and 461. The processor 120 may determine the number of non-light emitting periods to be included as a black period, based on the determined number of duty cycles. For example, when the number of duty cycles 411 is 2, the processor 120 may set a black period 419 to 2; when the number of duty cycles 461 is 3, the processor 120 may set a black period 469 is set to 3; and when the number of duty cycles 421 is 4, the processor 120 may set a black period 429 to 4. The processor 120 may include a black period (e.g., 419, 429, 439, 449, 459, and 469) including as many non-light emitting periods as the number of light emitting periods included in the frequency operation cycle (e.g., 418, 428, 438, 448, 458, and 468) or the number of duty cycles included in the frequency operation cycle. For example, the processor 120 may include the black period 419 (e.g., a and b) including two non-light emitting periods (e.g., a and b) in the frequency operation cycle 418 of the 120-Hz frequency 410, and may include the black period 469 (e.g., a, b, and c) including three non-light emitting periods (e.g., a, b, and c) in the frequency operation cycle 468 of the 120-Hz frequency 460. Further, the processor 120 may include the black period 429 including four non-light emitting periods (e.g., a, b, c, and d) in the frequency operation cycle 428 of the 90-Hz frequency 420, may include the black period 439 including six non-light emitting periods (e.g., a, b, c, d, e, and f) in the frequency operation cycle 438 of the 60-Hz frequency 430, and may include the black period 449 including 12 non-light emitting periods (e.g., a, b, . . . , k, and l) in the frequency operation cycle 448 of the 30-Hz frequency 440.

According to various embodiments, the processor 120 may adjust the black period, based on the number of duty cycles included in the frequency operation cycle. For example, the processor 120 may adjust the number (or count) of non-light emitting periods included in the black period, based on the number of duty cycles included in the frequency operation cycle. The number of duty cycles 451 included in the frequency operation cycle 458 corresponding to the 24-Hz frequency 450 is 15, which is considerably greater than that of the 120-Hz frequency 410. In this case, the processor 120 may include a black period 459 including six non-light emitting periods in the frequency operation cycle 458 corresponding to the 24-Hz frequency 450.

According to various embodiments, the processor 120 may include the black period in the middle of the frequency operation cycle, based on the black period. The number of duty cycles 441 in the frequency operation cycle 448 of the 30-Hz frequency 440 may be 12, and the black period 449 may also be 12. In this case, the processor 120 may include the black period 449 in the middle (e.g., the eighth or tenth) of the duty cycles 441 included in the frequency operation cycle 448 of the 30-Hz frequency 440. The number of duty cycles 451 included in the frequency operation cycle 458 of the 24-Hz frequency 450 may be 15, and the black period 459 may also be 15. In this case, the processor 120 may include the black period 459 in the middle (e.g., the tenth) of the duty cycles 451 included in the frequency operation cycle 458 of the 24-Hz frequency 450.

Figure 5:
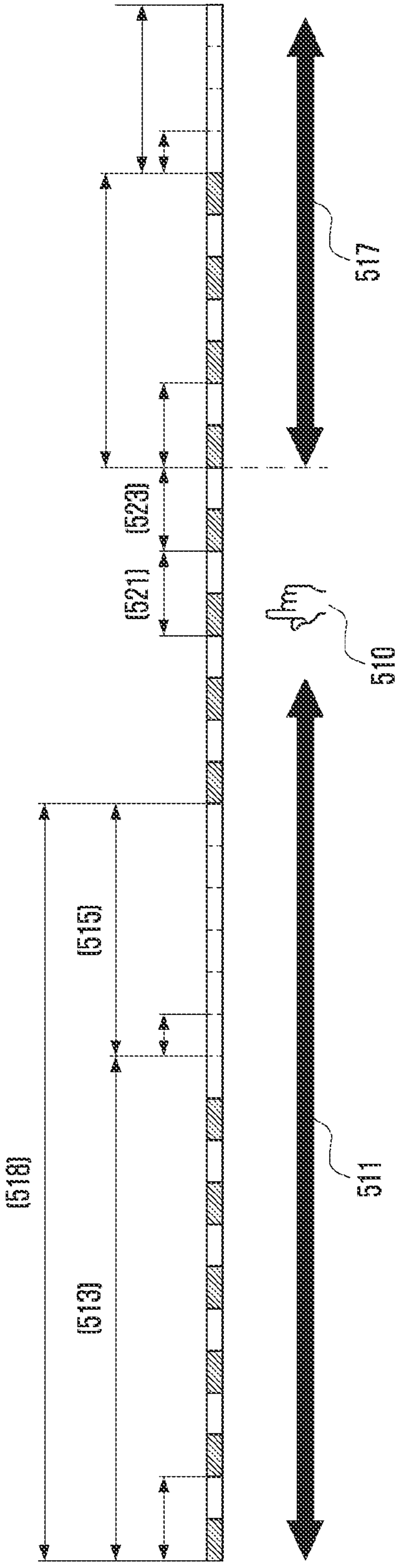
FIG. 5 is a diagram illustrating an example of changing a frequency during a frequency operation cycle based on a user input according to various embodiments.

FIG. 5 is a diagram illustrating an example of changing a frequency during a frequency operation cycle according to various embodiments.

Referring to FIG. 5, when an event 510 is detected, a processor (e.g., the processor 120 of FIG. 1) of an electronic device (e.g., the electronic device 101 of FIG. 1) according to various embodiments may change a frequency during a frequency operation cycle (e.g., refresh period). For example, the processor 120 may drive a display (e.g., the display device 160 of FIG. 1) at a first frequency 511 (e.g., 60 Hz), and may change the frequency to a second frequency 517 (e.g., 90 Hz) before a frequency operation cycle 518 of the first frequency 511 expires when the event 510 is detected while driving the display at the first frequency 511. For example, the first frequency 511 is a 60-Hz frequency, and the frequency operation cycle 518 includes six duty cycles 513 including a light emitting period and a non-light emitting period and a black period 515 including six non-light emitting periods. When the event 510 is detected while driving a third duty cycle 521 including a light emitting period and a non-light emitting period at the first frequency 511, the processor 120 may drive a fourth duty cycle 523 at the first frequency 511 and may then perform driving at the second frequency 517. Since the first frequency 511 and the second frequency 517 have the same time of one duty cycle, it may be possible to provide a seamless screen due to an insignificant difference in brightness between frequencies even when changing to the second frequency 517 in the middle of the frequency operation cycle 518 of the first frequency 511.

Figure 6:
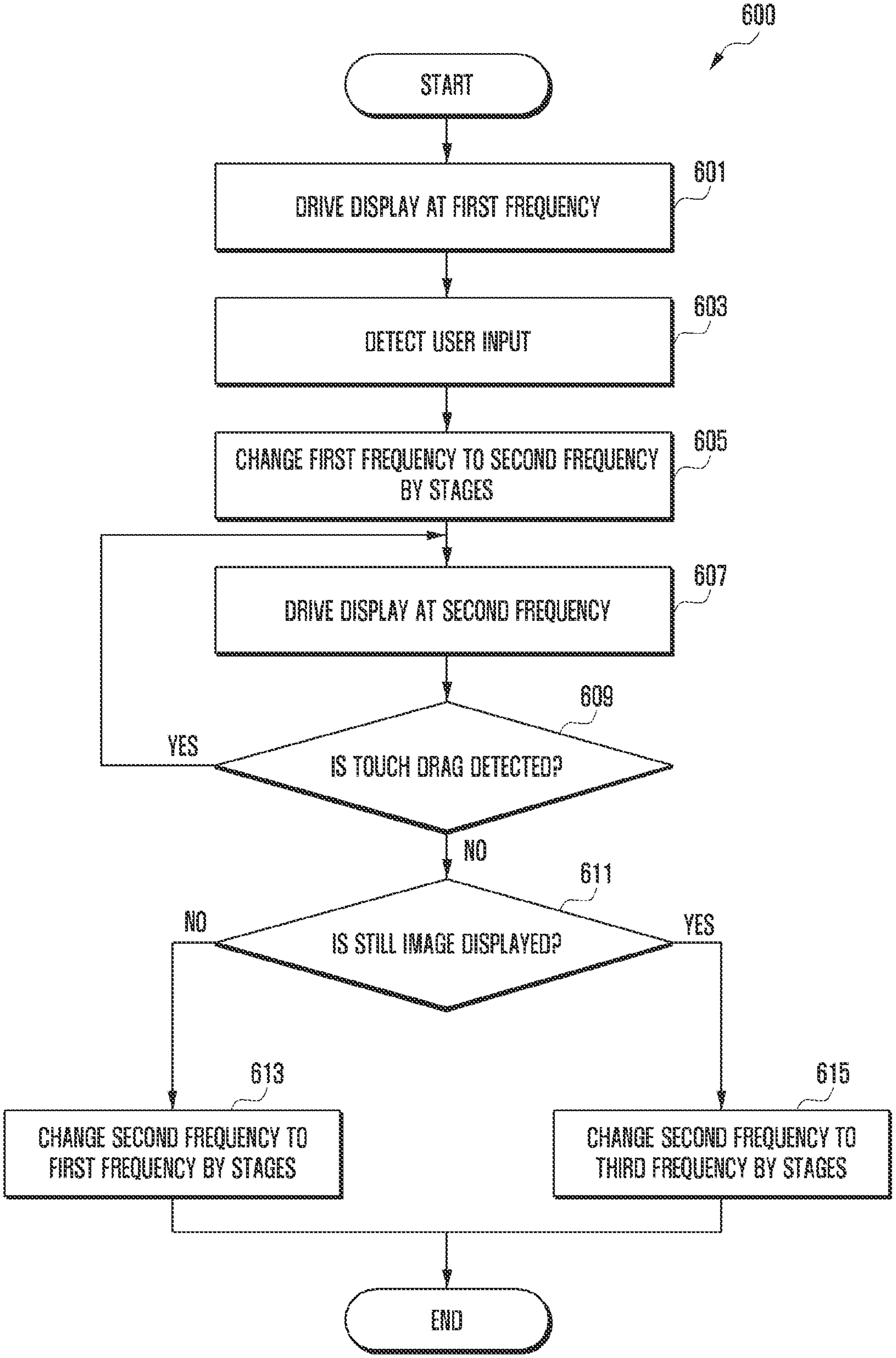
FIG. 6 is a flowchart illustrating an example frequency change method of an electronic device according to various embodiments.

FIG. 6 is a flowchart 600 illustrating an example frequency change method of an electronic device according to various embodiments.

Referring to FIG. 6, in operation 601, a processor (e.g., the processor 120 of FIG. 1) of an electronic device (e.g., the electronic device 101 of FIG. 1) according to various embodiments may control the electronic device to drive a display (e.g., the display device 160 of FIG. 1) at a first frequency. The first frequency may, for example, be at least one of 1 Hz to 120 Hz. Hereinafter, the first frequency may be described as 60 Hz to aid in understanding of the disclosure. However, the disclosure is not limited by the description. Operation 601 may be equivalent or similar to operation 203 of FIG. 2.

In operation 603, the processor 120 may detect a user input. The user input may include, for example, at least one of a touch by a user on one point of the display device 160 with a touch input tool (e.g., a user's body part (e.g., a finger) or a stylus pen), detachment of a pen (e.g., a stylus pen) mounted on the electronic device 101, a voice command, an input with a physical button, or an input through a sensor. The processor 120 may detect a touch input on at least one point of the display device 160 through touch circuitry. The processor 120 may detect a user input, such as detachment of a pen (e.g., a stylus pen) from the electronic device 101, a voice command to call the electronic device 101 from a microphone (e.g., the input device 150 of FIG. 1), or selection of a physical button.

In operation 605, the processor 120 may change the first frequency to a second frequency by stages. The second frequency is a frequency changed according to detection of the user input and may be higher than the first frequency. The second frequency may be preset in the electronic device 101. Hereinafter, the second frequency may be described as 120 Hz to aid in understanding of the disclosure. However, the disclosure is not limited by the description. The frequency change by stages may refer, for example, to changing to the second frequency via any other frequency, rather than changing from the first frequency directly to the second frequency. Hereinafter, any other frequency is described as 90 Hz in order to aid in understanding of the disclosure, but the other frequency may be a frequency other than 90 Hz. For example, the processor 120 may change from a 60-Hz frequency to a 90-Hz frequency and then from the 90-Hz frequency to a 120-Hz frequency, rather than changing the frequency from a 60-Hz frequency directly to a 120-Hz frequency. According to various embodiments, the processor 120 may change to the 90-Hz frequency in the middle of a frequency operation cycle (e.g., the frequency operation cycle 438 of FIG. 4A) corresponding to the 60-Hz frequency.

According to various embodiments, the processor 120 may change to the 90-Hz frequency, may drive the display device 160 according to a frequency operation cycle corresponding to the 90-Hz frequency, and may then change to the 120-Hz frequency. Driving the display device 160 according to the frequency operation cycle corresponding to the 90-Hz frequency may refer, for example, to driving one frame at the 90-Hz frequency. For example, the processor 120 may change to the 90-Hz frequency and may drive the display device 160 for four light emitting periods and non-light emitting periods (e.g., the frequency operation cycle 428 of 90 Hz in FIG. 4B). The processor 120 may drive the display device 160 for one frame at the 90-Hz frequency and may then change to the 120-Hz frequency.

According to various embodiments, the processor 120 may omit operation 605. For example, when there is an insignificant frequency difference between the first frequency and the second frequency, the processor 120 may skip operation 605 and may immediately perform operation 607.

In operation 607, the processor 120 may drive the display (e.g., the display device 160) at the second frequency. The processor 120 may drive the display device 160 at the 120-Hz frequency. Although the processor 120 is described as separately performing operation 605 of changing the frequency and operation 607 of driving the frequency to aid in understanding of the disclosure, operation 605 and operation 607 may be performed simultaneously.

In operation 609, the processor 120 may determine whether a touch drag is detected. The touch drag may be detected simultaneously with the user input (e.g., operation 603) or after the user input. The touch drag may include, for example, at least one of a multi-touch, a drag, or a drag and drop among the user inputs. When the touch drag is detected ("Yes" in operation 609), the processor 120 may perform operation 607, and when the touch drag is not detected ("No" in operation 609), the processor 120 may perform operation 611. When the touch drag is detected, the processor 120 may return to operation 607 and may drive the display device 160 at the second frequency.

Hereinafter, an operation of changing the frequency when a touch drag is detected is illustrated, but operation 607 may be maintained even though a touch drag is not detected. For example, the processor 120 may maintain the second frequency even though a touch drag is not detected.

When the touch drag is not detected, the processor 120 may determine whether a still image is displayed in operation 611. The still image may, for example, be an image that does not express a movement or does not have a time element and may be, for example, a document, a picture, a photo, a web page, or a webtoon, etc. The processor 120 may determine whether data (or information or a screen) displayed on the display device 160 corresponds to a still image. When the still image is not displayed ("No" in operation 611), the processor 120 may perform operation 613, and when the still image is displayed ("Yes" in operation 611), the processor 120 may perform operation 615.

When the still image is not displayed, the processor 120 may change the second frequency to the first frequency by stages in operation 613. For example, the processor 120 may change from the 120-Hz frequency to the 90-Hz frequency and then from the 90-Hz frequency to the 60-Hz frequency, rather than changing from the 120-Hz frequency immediately to the 60-Hz frequency. According to various embodiments, the processor 120 may change to the 90-Hz frequency in the middle of a frequency operation cycle of the 120-Hz frequency (e.g., the frequency operation cycle 418 of FIG. 4A). The processor 120 may change from the 120-Hz frequency to the 90-Hz frequency, may drive the display device 160 according to the frequency operation cycle (e.g., the frequency operation cycle 428 of FIG. 4B) corresponding to the 90-Hz frequency, and may change to the 60-Hz frequency. Operation 613, which changes the frequency from a high frequency to a low frequency by stages, and operation 605, which changes the frequency from a low frequency to a high frequency by stages, are different only in frequency but may perform equivalent or similar operations. According to various embodiments, when there is an insignificant frequency difference between the first frequency and the second frequency, the processor 120 may change the second frequency directly to the first frequency, rather than changing the frequency by stages.

According to various embodiments, when a user input is not detected for a certain time according to content displayed on the display device 160, the processor 120 may maintain the frequency of the display at a high speed. For example, when high-speed photographing is temporarily paused and is then resumed or when a game application configure to be executed at a high frequency is temporarily paused and is then played again, the processor 120 may maintain the frequency of the display at a high speed. When the still image is displayed, the processor 120 may change the second frequency to a third frequency by stages in operation 615. For example, the third frequency may refer to a frequency lower than the first frequency. The third frequency may be preset in the electronic device 101. Hereinafter, the third frequency may be described as 1 Hz to aid in understanding of the disclosure. However, the disclosure is not limited by the description.

The processor 120 may change from the 120-Hz frequency to the 90-Hz frequency, may drive the display device 160 according to the frequency operation cycle (e.g., the frequency operation cycle 428 of FIG. 4B) corresponding to the 90-Hz frequency, and may then change to the 60-Hz frequency. The processor 120 may drive the display device 160 according to a frequency operation cycle (e.g., the frequency operation cycle 438 of FIG. 4B) corresponding to the 60-Hz frequency and may then change the 30-Hz frequency. Next, the processor 120 may drive the display device 160 according to a frequency operation cycle (e.g., the frequency operation cycle 448 of FIG. 4C) corresponding to the 30-Hz frequency and may then change o 1-Hz frequency.

The processor 120 may drive the display device 160 according to the frequency operation cycle (e.g., the frequency operation cycle 448 in FIG. 4C) corresponding to the 30-Hz frequency, may change to a 24-Hz frequency, may drive the display device 160 according to a frequency operation cycle (e.g., the frequency operation cycle 458 of FIG. 4C) corresponding to the 24-Hz frequency, and may then change to the 1-Hz frequency. According to various embodiments, when there is an insignificant frequency difference between the second frequency and the third frequency, the processor 120 may change the second frequency directly to the third frequency, rather than changing the frequency by stages.

Figure 7:
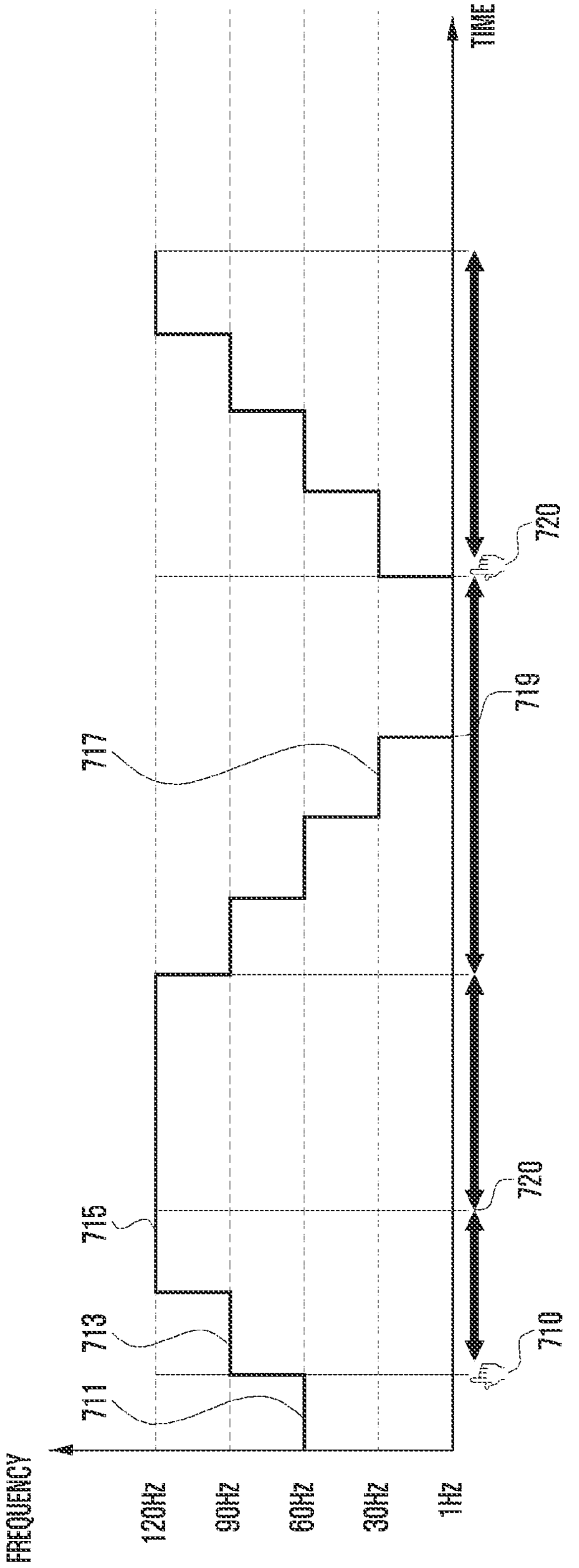
FIG. 7 is a diagram illustrating an example of changing a frequency by stages in an electronic device according to various embodiments.

FIG. 7 is a diagram illustrating an example of changing a frequency by stages in an electronic device according to various embodiments.

Referring to FIG. 7, a processor (e.g., the processor 120 of FIG. 1) of an electronic device (e.g., the electronic device 101 of FIG. 1) according to various embodiments may detect a user input 710 while driving a display (e.g., the display device 160 of FIG. 1) at a 60-Hz frequency 711. The user input may include at least one of a touch input, detachment of a pen (e.g., a stylus pen) mounted on the electronic device 101, a voice command, an input with a physical button, or an input through a sensor, etc. When the user input 710 is detected, the processor 120 may change the 60-Hz frequency 711 to a 120-Hz frequency 715 by stages. According to various embodiments, the processor 120 may change to a 90-Hz frequency 713 in the middle of a frequency operation cycle (e.g., the frequency operation cycle 438 of FIG. 4B) of the 60-Hz frequency 711. The processor 120 may change the 60-Hz frequency 711 to the 90-Hz frequency 713, may drive the display device 160 according to a frequency operation cycle (e.g., the frequency operation cycle 428 of FIG. 4B) of the 90-Hz frequency 713, and may change to the 120-Hz frequency 715.

After changing to the 120-Hz frequency 715, when a touch drag 720 is detected, the processor 120 may drive the display device 160 at the 120-Hz frequency 715. When the touch drag 720 is not detected, the processor 120 may change the 120-Hz frequency 715 to a 1-Hz frequency 719 by stages. When the touch drag 720 is not detected and a variance in a displayed image is less than a reference value, the processor 120 may change the 120-Hz frequency 715 to the 1-Hz frequency 719 by stages. According to various embodiments, the processor 120 may change to the 90-Hz frequency 713 in the middle of a frequency operation cycle (e.g., the frequency operation cycle 418 of FIG. 4A of the 120-Hz frequency 715). The processor 120 may change the 120-Hz frequency 715 to the 90-Hz frequency 713, may drive the display device 160 according to the frequency operation cycle (e.g., the frequency operation cycle 428 of FIG. 4B) of the 90-Hz frequency 713, and may change to the 60-Hz frequency 711. The processor 120 may change to the 60-Hz frequency 711, may drive the display device 160 according to the frequency operation cycle (e.g., the frequency operation cycle 438 of FIG. 4B) of the 60-Hz frequency 711, and may then change to a 30-Hz frequency 717. The processor 120 may change to the 30-Hz frequency 717, may drive the display device 160 according to a frequency operation cycle (e.g., the frequency operation cycle 448 of FIG. 4C) of the 30-Hz frequency 717, and may then change to the 1-Hz frequency 719.

Figure 8:
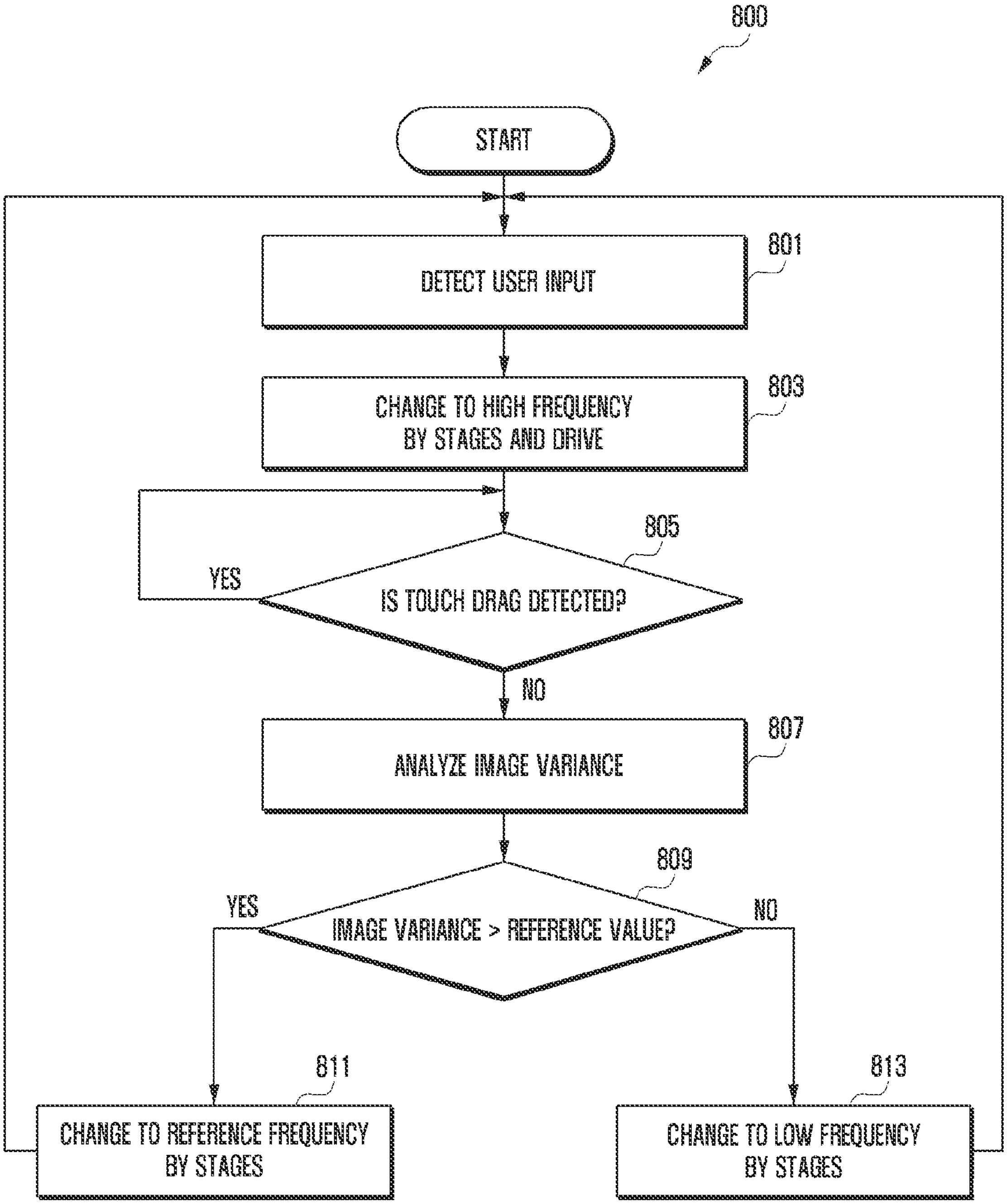
FIG. 8 is a flowchart illustrating an example frequency change method of an electronic device according to various embodiments.

FIG. 8 is a flowchart 800 illustrating an example frequency change method of an electronic device according to various embodiments.

Referring to FIG. 8, in operation 801, a processor (e.g., the processor 120 of FIG. 1) of an electronic device (e.g., the electronic device 101 of FIG. 1) according to various embodiments may detect a user input. The user input may include, for example, at least one of a touch input, detachment of a pen (e.g., a stylus pen) mounted on the electronic device 101, a voice command, an input with a physical button, or an input through a sensor, etc. According to various embodiments, the processor 120 may detect the user input while driving a display (e.g., the display device 160 of FIG. 1) at a frequency of at least one of 1 Hz to 120 Hz. Operation 801 is equivalent or similar to operation 603 of FIG. 6, and thus a detailed description thereof may not be repeated here.

In operation 803, the processor 120 may change and drive the driving frequency of the display device 160 to a high frequency by stages. For example, the processor 120 may change the frequency to 120 Hz to drive the display device 160. When the user input is detected in operation 801 while the display device 160 is operating at a 30-Hz frequency, the processor 120 may change the 30-Hz frequency to a 60-Hz frequency, may drive the display device 160 according to a frequency operation cycle (e.g., the frequency operation cycle 438 of FIG. 4B) of the 60-Hz frequency, may change to a 90-Hz frequency, may drive the display device 160 (e.g., for one frame) according to a frequency operation cycle (e.g., the frequency operation cycle 428 of FIG. 4B) of the 90-Hz frequency, and may then change to the 120-Hz frequency. When the user input is detected in operation 801 while the display device 160 is operating at a 1-Hz frequency, the processor 120 may change the 1-Hz frequency to the 30-Hz frequency, may drive the display device 160 according to a frequency operation cycle (e.g., the frequency operation cycle 448 of FIG. 4B) of the 30-Hz frequency, may change to 60 Hz, may drive the display device 160 according to the frequency operation cycle (e.g., the frequency operation cycle 438 of FIG. 4B) of the 60-Hz frequency, may change to the 90-Hz frequency, may drive the display device 160 according to the frequency operation cycle (e.g., the frequency operation cycle 428 of FIG. 4B) of the 90-Hz frequency, and may then change to 120 Hz.

In operation 805, the processor 120 may determine whether a touch drag is detected. The touch drag may be detected simultaneously with the user input (e.g., operation 801) or after the user input. The touch drag may include, for example, at least one of a multi-touch, a drag, or a drag and drop, etc., among the user inputs. When the touch drag is detected ("Yes" in operation 805), the processor 120 may repeatedly perform operation 805, and when the touch drag is not detected ("No" in operation 805), the processor 120 may perform operation 807. When the touch drag is detected, the processor 120 may monitor whether the touch drag is released. Operation 805 is equivalent or similar to operation 609 of FIG. 6, and thus a detailed description thereof may not be repeated here.

In operation 807, the processor 120 may analyze an image variance. The processor 120 may analyze an image variance on a screen displayed on the display device 160. The processor 120 may analyze an image variance over time from the displayed screen, thereby detecting the image variance. The processor 120 may receive the image variance from a DDI.

In operation 809, the processor 120 may determine whether the image variance exceeds a reference value. The reference value may be a criterion for changing the driving frequency of the display device 160 and may be preset in the electronic device 101. When the image variance exceeds the reference value ("Yes" in operation 809), the processor 120 may perform operation 811, and when the image variance is the reference value or less ("No" in operation 809), the processor 120 may perform operation 813.

When the image variance exceeds the reference value, the processor 120 may change to a reference frequency by stages in operation 811. The reference frequency may, for example, be a frequency operating in the normal mode and may be preset in the electronic device 101. For example, the processor 120 may change the high frequency to the reference frequency via an arbitrary frequency (e.g., 90 Hz), rather than changing from the high frequency (e.g., 120 Hz) directly to the reference frequency (e.g., 60 Hz). For example, the processor 120 may change the 120-Hz frequency to the 90-Hz frequency, may drive the 90-Hz frequency for one frame, and may then change to the 60-Hz frequency. According to various embodiments, when there is an insignificant frequency difference between the high frequency and the reference frequency, the processor 120 may change the high frequency directly to the reference frequency, rather than changing the frequency by stages.

When the image variance is the reference value or less, the processor 120 may change to a low frequency by stages in operation 813. The low frequency may, for example, be a frequency at which the display device 160 operates in a power saving mode and may be preset in the electronic device 101. For example, the processor 120 may change the high frequency to the low frequency via an arbitrary frequency (e.g., 90 Hz, 60 Hz, or 30 Hz), rather than changing the high frequency (e.g., 120 Hz) directly to the low frequency (e.g., 1 Hz). For example, the processor 120 may change the 120-Hz frequency to the 90-Hz frequency, may drive the 90-Hz frequency for one frame, may change to the 60-Hz frequency, may drive the 60-Hz frequency for one frame, may change to the 30-Hz frequency, may drive the 30-Hz frequency for one frame, and may then change to the 1-Hz frequency.

According to various embodiments, when the image variance exceeds a first reference value, the processor 120 may maintain the high frequency. When the image variance is the first reference value or less and a second reference value or greater, the processor 120 may change to the reference frequency. The second reference value may be an image variance lower than the first reference value. When the image variance is less than the second reference value, the processor 120 may change to the low frequency.

Figure 9:
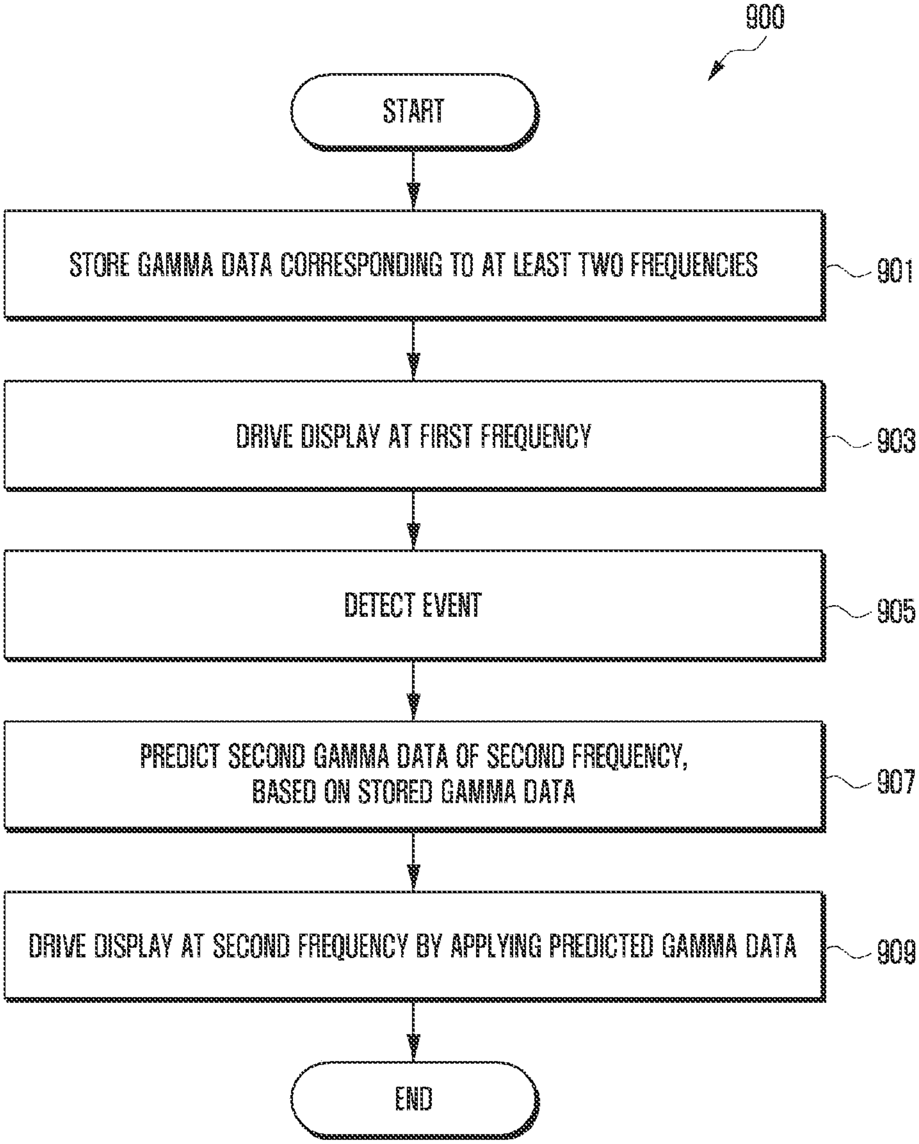
FIG. 9 is a flowchart illustrating an example display driving method of an electronic device according to various embodiments.

FIG. 9 is a flowchart 900 illustrating an example display driving method of an electronic device according to various embodiments.

Referring to FIG. 9, in operation 901, a processor (e.g., the processor 120 of FIG. 1) of an electronic device (e.g., the electronic device 101 of FIG. 1) according to various embodiments may store gamma data (or gamma value) corresponding to at least two frequencies of a display (e.g., the display device 160). Gamma data may refer, for example, to a value used to express the brightness (e.g., luminance) of the display device 160 and may vary for each operating frequency of the display device 160. The gamma data may be represented by a voltage value. The processor 120 may store the gamma data in a memory (e.g., the memory 130 of FIG. 1). As the number of operating frequencies of the display device 160 increases, the amount of data to be stored in the memory 130 increases, which may limit the use of the memory 130. In consideration of this aspect, the processor 120 may store gamma data corresponding to at least two frequencies (e.g., 120 Hz and 60 Hz) among operating frequencies of the display device 160 in the memory 130.

In operation 903, the processor 120 may drive the display (e.g., the display device 160) at a first frequency. The first frequency may be at least one of 1 Hz to 120 Hz. Hereinafter, the first frequency may be described as 120 Hz to aid in understanding of the disclosure. However, the disclosure is not limited by the description. Operation 903 may be equivalent or similar to operation 203 of FIG. 2 or operation 601 of FIG. 6.

In operation 905, the processor 120 may detect an event. The event may correspond to a trigger signal for a frequency change. The frequency change may refer, for example, to a change (or switch) to a frequency (e.g., 1 Hz or 30 Hz) lower than the driving frequency (e.g., 60 Hz) in operation 903 or a frequency (e.g., 90 Hz or 120 Hz) higher than the driving frequency. For example, the processor 120 may determine that the event is detected when at least one is detected among detection of a user input, execution of a preset (or specific) application, detection of a user input within a preset application, a case where an image variance is a reference value or higher, display of a still image, or a case where the electronic device 101 is unavailable for a preset time. Operation 905 may be equivalent or similar to operation 205 of FIG. 2.

In operation 907, the processor 120 may predict second gamma data of a second frequency, based on the stored gamma data. The second frequency may refer, for example, to a frequency (e.g., a high frequency, 90 Hz, or 120 Hz) higher than the first frequency or a frequency (e.g., a low frequency, 1 Hz, 24 Hz, or 30 Hz) lower than the first frequency. For example, when the second frequency is 90 Hz, the processor 120 may predict gamma data of the 90-Hz frequency, based on the gamma data stored corresponding to 120-Hz frequency. Alternatively, when the second frequency is 30 Hz, the processor 120 may predict gamma data of the 30-Hz frequency, based on gamma data stored corresponding to the 60-Hz frequency. When the second frequency corresponds to a frequency stored in operation 901, the processor 120 may omit operation 907.

In operation 909, the processor 120 may drive the display (e.g., the display device 160) at the second frequency by applying the predicted gamma data. The gamma data indicates the brightness of the display device 160. The greater the gamma data is, the higher the brightness is, and the smaller the gamma data is, the lower the brightness is. For example, when the second frequency is 120 Hz, the processor 120 may drive the display device 160 at the second frequency by adjusting (e.g., increasing) the stored gamma data corresponding to the 90-Hz frequency by a reference value or more. When the second frequency is 30 Hz, the processor 120 may drive the display device 160 at the second frequency by adjusting (e.g., decreasing) the stored gamma data corresponding to the 60-Hz frequency by a reference value or less. The processor 120 may drive the display device 160 at the second frequency through a DDI used to drive pixels included in the display device 160.

Figure 10:
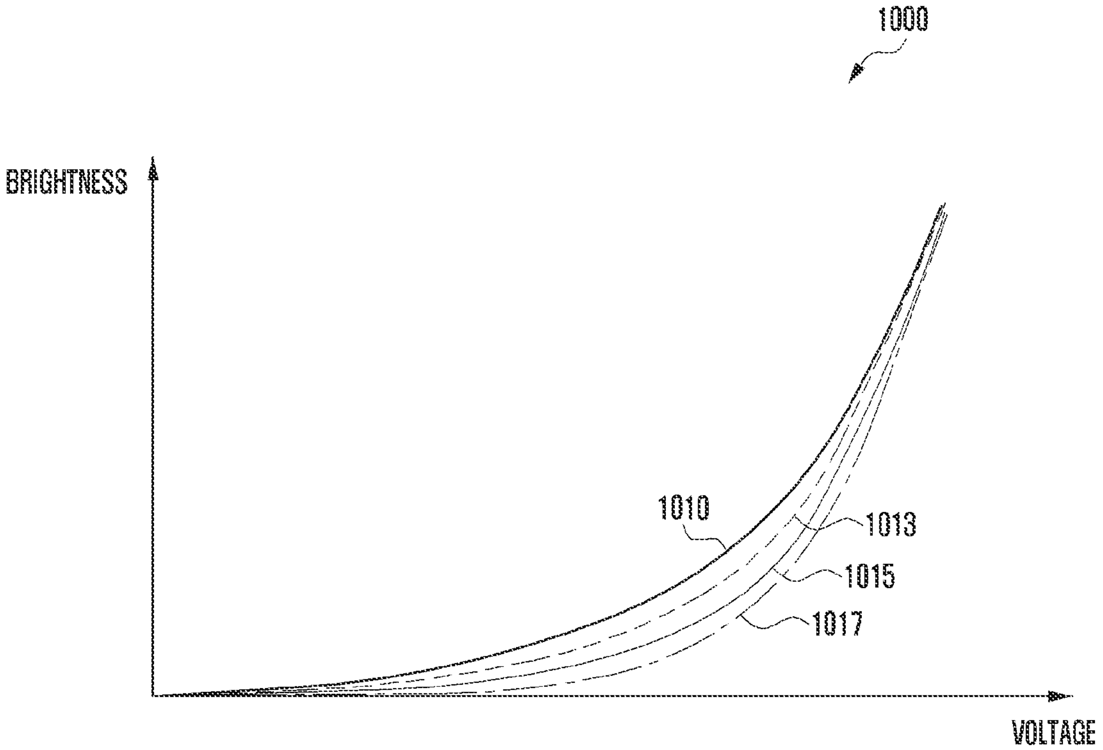
FIG. 10 is a graph illustrating an example for predicting gamma data of a frequency in an electronic device according to various embodiments.

FIG. 10 is a graph 1000 illustrating an example of predicting gamma data of a frequency in an electronic device according to various embodiments.

Referring to FIG. 10, a processor (e.g., the processor 120 of FIG. 1 or a DDI) of an electronic device (e.g., the electronic device 101 of FIG. 1) according to various embodiments may store gamma data corresponding to at least two frequencies (e.g., 120 Hz and 60 Hz) in a memory (e.g., the memory 130 of FIG. 1). When an event is detected while driving a display (e.g., the display device 160) at a 60-Hz frequency, the processor 120 may change to a frequency corresponding to the detected event. For example, the processor 120 may predict gamma data 1017 of a 30-Hz frequency, based on gamma data 1015 of a 60-Hz frequency. Alternatively, the processor 120 may predict the gamma data 1017 at the 30-Hz frequency, based on gamma data 1010 of a 120-Hz frequency and intermediate gamma data 1013 of the 120-Hz frequency and the 60-Hz frequency. The processor 120 may drive the display device 160 at the 30-Hz frequency by applying the predicted gamma data 1017.

Figure 11:
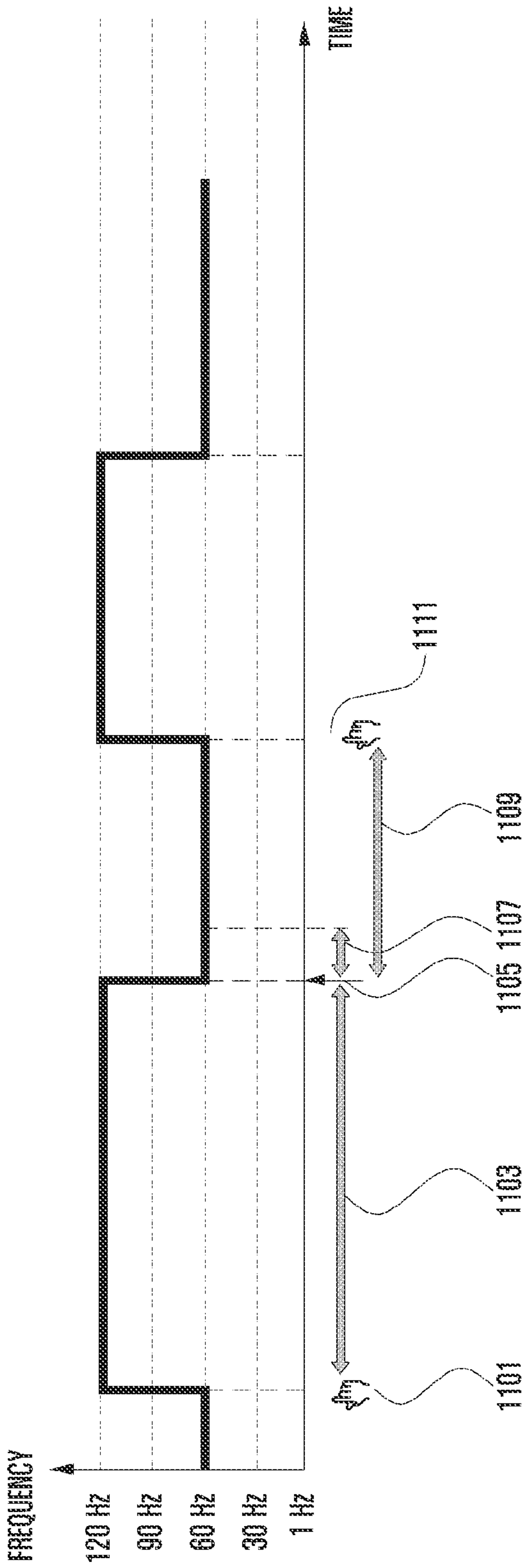
FIG. 11 is a diagram illustrating an example of changing a frequency according to a user input according to various embodiments.

FIG. 11 is a diagram illustrating an example of changing a frequency according to a user input according to various embodiments.

Referring to FIG. 11, when an event 1101 is detected a processor (e.g., the processor 120 of FIG. 1) of an electronic device (e.g., the electronic device 101 of FIG. 1) according to various embodiments may change a frequency during a frequency operation cycles of the frequency. For example, the processor 120 may drive a display (e.g., the display device 160 of FIG. 1) at a first frequency (e.g., 60 Hz), and may change the frequency to a second frequency (e.g., 120 Hz) when the event 1101 is detected while driving the display at the first frequency. The event 1101 may, for example, be a user input of scrolling the display device 160. The processor 120 may drive the display device 160 at the second frequency while the event 1101 is detected (1103). When release 1105 of the event (e.g., release of a touch scroll) is detected, the processor 120 may change the second frequency to the first frequency. While changing the frequency according to the release 1105 of the event (1109), the processor 120 may display a certain number of frames (e.g., one frame or 2 frames), based on content displayed on the display device 160 or a user input. For example, when the frequency is changed while a screen is rapidly changed according to a scroll input, a user may recognize a frequency change due to flicking on the screen.

In order to prevent this problem, the processor 120 may display a certain number of frames after the release 1105 of the event is detected for a certain time 1107 in view of content displayed on the display device 160 or a vector value of a user input. The vector value of the user input may include, for example, a scrolling direction or a scrolling speed. The processor 120 may obtain a frame to be displayed on the display device 160 by calculating the vector value of the user input and may display the obtained frame. The processor 120 may change to the second frequency when another event 1111 is detected while driving the display at the first frequency. When the frequency is changed, the processor 120 may add a frame, thereby providing a seamless screen between frequencies.

An operating method of an electronic device according to various example embodiments may include: operating according to a first number of duty cycles based on a display (e.g., the display device 160 of FIG. 1) of the electronic device operating at a first refresh rate; and operating according to a second number of duty cycles based on the display operating at a second refresh rate, wherein the first number may less than the second number based on the first refresh rate being higher than the second refresh rate.

The length of one duty cycle corresponding to the first refresh rate may be set to be substantially the same as the length of one duty cycle corresponding to the second refresh rate.

One refresh period may include a first porch period based on an operation being performed at the first refresh rate, and may include a second porch period different from the first porch period, based on an operation being performed at the second refresh rate.

According to various example embodiments, it is possible to set a frequency operation cycle corresponding to each frequency, based on a common divisor of frequencies of a display, to drive the display, based on the set frequency operation cycle, and to change the frequency of the display corresponding to an even when the event is detected.

According to various example embodiments, light emitting times and non-light emitting times at different frequencies may be controlled, thereby resolving flickering that occurs in a frequency change.

According to various example embodiments, a black (e.g., porch) period may be included in a frequency operation cycle, thereby preventing a brightness difference due to a frequency change.

According to various example embodiments, the frequency of a display may be changed to a low frequency, thereby reducing power consumption and improving the visibility of a user.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. An electronic device comprising:

a display;

a memory including information on duty cycles corresponding to each frequency of the display; and at least one processor, individually and/or collectively, configured to control the electronic device to:

perform an operation according to a first duty cycle configuration based on the display operating at a first frequency;

perform an operation according to a second duty cycle configuration based on the display operating at a second frequency;

based on detecting an event while driving the display at the first frequency, switch to driving the display at the second frequency, wherein the switch is made after a duty cycle at the time the event occurred and before a first duty cycle in the first frequency expires; and increase a number of duty cycles in the second duty cycle configuration relative to a number of duty cycles in the first duty cycle configuration by a multiple of an integer based at least on a determination that the second frequency is decreased relative to the first frequency, wherein one duty cycle comprises a light emitting period and a non-light emitting period.

2. The electronic device of claim 1, wherein a length of the light emitting period is the same a length of the non-light emitting period.

3. The electronic device of claim 1, wherein a length of one duty cycle included in the first duty cycle configuration is the same as a length of one duty cycle included in the second duty cycle configuration.

4. The electronic device of claim 1, wherein the at least one processor is configured to control the electronic device to switch to driving the display at the second frequency depending on an application being executed.

5. The electronic device of claim 1, wherein the processor is configured to control the electronic device to switch to driving the display at the second frequency by stages.

6. The electronic device of claim 1, wherein the at least one processor is configured to predict gamma data of unsaved frequency of the display based on stored gamma data corresponding to specified frequency of the display.

7. The electronic device of claim 1, wherein the at least one processor is configured to include a black period in one frame based on the duty cycles corresponding to each frequency of the display.

8. The electronic device of claim 1, wherein the at least one processor is configured to include as many non-light emitting periods as a number of light emitting periods included in the first duty cycle configuration, as first black periods in the first duty cycle configuration.

9. An operating method of an electronic device, the method comprising:

operating according to a first duty cycle configuration based on a display of the electronic device operating at a first frequency;

operating according to a second duty cycle configuration based on the display operating at a second frequency;

increasing a number of duty cycles in the second duty cycle configuration relative to a number of duty cycles in the first duty cycle configuration by a multiple of an integer based at least on a determination that the second frequency is decreased relative to the first frequency; and based on detecting an event while driving the display at the first frequency, switching to driving the display at the second frequency, wherein the switch is made after a duty cycle at the time the event occurred and before a first duty cycle in the first frequency expires, wherein one duty cycle comprises a light emitting period and a non-light emitting period.

10. The method of claim 9, wherein a length of the light emitting period is the same a length of the non-light emitting period.

11. The method of claim 9, further comprising switching to driving the display at the second frequency depending on an application being executed.

12. The method of claim 9, further comprising switching to driving the display at the second frequency by stages.

* * * * *